(12) United States Patent
Chen et al.

(10) Patent No.: US 9,612,377 B2
(45) Date of Patent: Apr. 4, 2017

(54) TOUCH SCREEN DISPLAY WITH TRANSPARENT ELECTRICAL SHIELDING LAYER

(71) Applicant: Apple Inc., Cupertino, CA (US)

(72) Inventors: Cheng Chen, San Jose, CA (US); Enkhamgalan Dorjgotov, San Francisco, CA (US); Masato Kuwabara, Tsukuba (JP); Wonjae Choi, Cupertino, CA (US); Martin P. Grunthaner, Mountain View, CA (US); Albert Lin, Sunnyvale, CA (US); John Z. Zhong, Saratoga, CA (US); Wei Chen, Palo Alto, CA (US); Steven P. Hotelling, Los Gatos, CA (US); Lynn R. Youngs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/965,657

(22) Filed: Dec. 10, 2015

(65) Prior Publication Data

US 2016/0097882 A1 Apr. 7, 2016

Related U.S. Application Data

(63) Continuation of application No. 13/549,311, filed on Jul. 13, 2012, now Pat. No. 9,329,314.

(51) Int. Cl.
*G02F 1/1333* (2006.01)
*G02B 5/30* (2006.01)
(Continued)

(52) U.S. Cl.
CPC .............. *G02B 5/3033* (2013.01); *G02B 1/11* (2013.01); *G02B 1/16* (2015.01); *G02F 1/13338* (2013.01); *G02F 1/133308* (2013.01); *G02F 1/133502* (2013.01); *G02F 1/133514* (2013.01); *G02F 1/133528* (2013.01); *G06F 3/041* (2013.01); *G06F 3/044* (2013.01); *G06F 3/0412* (2013.01); *H04N 9/3105* (2013.01); *H04N 9/3197* (2013.01); *G02F 1/134363* (2013.01);
(Continued)

(58) Field of Classification Search
CPC ......... G02F 2001/136218; G02F 2001/133334
See application file for complete search history.

(56) References Cited

U.S. PATENT DOCUMENTS 6,861,136 B2 3/2005 Verlinden et al.
7,199,518 B2 4/2007 Couillard
(Continued)

FOREIGN PATENT DOCUMENTS

CN 101075030 11/2007
CN 101971345 2/2011
(Continued)

*Primary Examiner* — Phu Vu
(74) *Attorney, Agent, or Firm* — Zachary D. Hadd; Joseph F. Guihan

(57) ABSTRACT

A polarizer includes a polarizer component having a top surface and an opposite bottom surface. The bottom surface is configured to couple to a color filter layer for a liquid crystal display. The polarizer also includes a transparent conducting layer disposed over the top surface. The transparent conducting layer being configured to electrically shield the LCD from a touch panel. The polarizer further includes a coating layer disposed over the transparent conducting layer.

21 Claims, 19 Drawing Sheets

(51) Int. Cl.
*H04N 9/31* (2006.01)
*G06F 3/041* (2006.01)
*G02B 1/16* (2015.01)
*G02B 1/11* (2015.01)
*G02F 1/1335* (2006.01)
*G06F 3/044* (2006.01)
*G02F 1/1362* (2006.01)
*G02F 1/1343* (2006.01)

(52) U.S. Cl.
CPC ............ *G02F 2001/133334* (2013.01); *G02F 2001/136218* (2013.01); *G02F 2202/28* (2013.01); *G06F 2203/04107* (2013.01)

(56) References Cited

U.S. PATENT DOCUMENTS

| | | | |
|---|---|---|---|
| 7,231,733 | B2 | 6/2007 | Regelin |
| 7,242,398 | B2 | 7/2007 | Nathan et al. |
| 7,535,462 | B2 | 5/2009 | Spath et al. |
| 8,094,247 | B2 | 1/2012 | Allemand et al. |
| 8,164,698 | B2 | 4/2012 | Kim et al. |
| 8,294,869 | B2 | 10/2012 | Yamaguchi et al. |
| 8,482,713 | B2 | 7/2013 | Qi et al. |
| 8,692,948 | B2 | 4/2014 | Park et al. |
| 2004/0212599 | A1 | 10/2004 | Cok et al. |
| 2006/0204675 | A1 | 9/2006 | Gao et al. |
| 2007/0268243 | A1 | 11/2007 | Choo et al. |
| 2008/0062140 | A1 | 3/2008 | Hotelling et al. |
| 2008/0218369 | A1 | 9/2008 | Krans et al. |
| 2009/0147167 | A1 | 6/2009 | Park |
| 2009/0243817 | A1 | 10/2009 | Son |
| 2011/0216020 | A1 | 9/2011 | Lee et al. |
| 2012/0127387 | A1 | 5/2012 | Yamato et al. |
| 2013/0271697 | A1 | 10/2013 | DeForest et al. |
| 2016/0097882 | A1* | 4/2016 | Chen ...................... G06F 3/041 349/96 |

FOREIGN PATENT DOCUMENTS

| | | |
|---|---|---|
| CN | 102279480 | 12/2011 |
| JP | 2012-8255 | 1/2012 |
| KR | 2001-0093352 | 10/2001 |
| TW | 200608272 | 3/2006 |

* cited by examiner

TOUCH SCREEN DISPLAY WITH TRANSPARENT ELECTRICAL SHIELDING LAYER

This application is a continuation of U.S. patent application Ser. No. 13/549,311, filed Jul. 13, 2012 which is hereby incorporated by reference herein in its entirety. This application claims the benefit of and claims priority to U.S. patent application Ser. No. 13/549,311, filed Jul. 13, 2012.

TECHNICAL FIELD

The present invention generally relates to touch screen display that includes an in-plane switching (IPS) liquid crystal display (LCD) and a touch panel. More specifically, the invention relates to the touch screen display with a transparent shielding layer to reduce noise coupled from the IPS LCD into the touch panel.

BACKROUND

In-plane switching (IPS) LCD uses thin film transistor (TFT) technology to improve image quality. The IPS LCD delivers bright pictures with very good color consistency at a wide viewing angle. IPS LCDs are used in television sets, computer monitors, mobile phones, handheld systems, personal digital assistants, navigation systems, projectors, and many other devices.

An IPS LCD includes an array of pixels for displaying images. The pixels are addressed in rows and columns, reducing the connection count from millions for each individual pixel to thousands. The column and row wires attach to transistor switches, one transistor for each pixel. The one-way current passing characteristic of the transistor prevents the charge applied to the pixel from draining between refreshes to the display image.

In an IPS LCD, the liquid crystal extends horizontally across the panel and essentially provides a wide viewing angle, fast response speed, and a simple pixel structure. The IPS LCD employs pairs of electrodes at the sides of each cell, applying an electric field horizontally through the material. This approach keeps the liquid crystals parallel to the front of the panel, thereby increasing the viewing angle.

FIG. 1A illustrates a perspective view of an electronic device, such as an IPAD. The electronic device includes a touch screen display 100 enclosed by a housing 138. The touch screen display 100 includes a touch panel 102 on a front and an LCD display behind the touch panel 102, although alternative embodiments may employ an OLED layer instead of an LCD. A cross-section is taken along line 2-2 in FIG. 1A. FIG. 1B illustrates a simplified cross-section diagram for the touch screen display of FIG. 1A. Touch screen display 100 includes a touch panel 102 above an IPS LCD 104. The touch screen display 100 may have an air gap 106 between the touch panel 102 and the IPS LCD 104. Alternatively, in a full lamination design, an optically clear adhesive (OCA) may connect the touch panel and the LCD such that there is no air gap between the touch panel and display.

FIG. 1C illustrates a cross-section of an embodiment of an IPS LCD of FIG. 1B. The IPS LCD 104 includes a front polarizer 118, a rear polarizer 108, and liquid crystal layer 112 between the front and rear polarizers. The IPS LCD 104 also includes TFT layer arranged between the liquid crystal layer 112 and the rear polarizer 108. The IPS LCD 104 further includes color filter (CF) layer or glass 114 arranged between the front polarizer 118 and the liquid crystal layer 112. The IPS LCD 104 further includes a backlight 130 configured to provide white light to the rear polarizer 108.

The IPS LCD usually does not have common electrodes on the color filter (CF) glass, and so is vulnerable to electrostatic discharge (ESD). A conducting coating, for example, indium-tin oxide (ITO) coating, is often put on the top surface of the CF glass to help reduce vulnerability to ESD.

The IPS LCD 104 may also include an ITO coating 116 on a top surface of the CF glass 114, such that the front polarizer 118 is disposed over the ITO coating 116. The ITO coating 116 also provides shielding to the touch panel 102 from the TFT layer 110. The front polarizer 118 may include an adhesive layer 136, one or more optical films and/or compensation films 134, a polyvinyl alcohol (PVA) with an iodine doping layer 126, and a plastic film 128, such as triacetycellulose (TAC), cyclo-olefin polymer (COP), poly (ethylene terephthalate) (PET) or Poly(methyl methacrylate) (PMMA) film. The PVA absorbs light forming particular polarizers.

Generally, noise may be coupled from the IPS LCD 104 to the touch panel 102. When the stackup of the touch panel and the IPS LCD becomes thinner, the noise in the touch panel may increase. In order to provide better shielding, the ITO coating may need to be thicker. However, optical transmittance may be reduced as a result of increasing thickness of the ITO coating. Acquiring both lower noise (or higher shielding) and higher light transmittance (or lower reflection) becomes challenges for thinner touch screen displays.

There may be a trade-off between aspects of product design and touch performance. Basically, it may be desirable not only to reduce product thickness, which may result in the touch panel and the LCD being closer to each other, but also to reduce light reflection from the front of the display. However, touch screen performance and operation may be affected by electrical noise.

There remains a need for developing techniques to resolve the above issues to meet the customer needs of new touch screen display products.

SUMMARY

Embodiments described herein may provide an IPS LCD with a transparent conducting layer on a top surface of a front polarizer of the LCD. The conducting layer may include microscopic metal meshes, such as silver nano-wires (AGNW). Compared to the conventional display, the IPS LCD with a metal mesh coated front polarizer may improve display transmittance and reduce light reflection, while still providing adequate electrical shielding for a capacitative touch panel. The improved light transmittance may enable better power efficiency for the LCD, because less power would be required for the backlight of the LCD due to higher transmittance. The IPS LCD may also be thinner than the conventional display, due to replacement of the conventional thick ITO with a transparent AGNW mesh. The IPS LCD may also reduce the manufacturing complexity of a IPS-type of display by removing one post-cell process, as well as reducing the total reflectivity of the display.

In one embodiment, a polarizer includes a polarizer component having a top surface and an opposite bottom surface. The bottom surface is configured to couple to a color filter layer for a liquid crystal display. The polarizer also includes a transparent conducting layer disposed over the top surface. The transparent conducting layer being configured to electrically shield the LCD from a touch panel.

The polarizer further includes a coating layer disposed over the transparent conducting layer.

In another embodiment, an LCD device is provided. The LCD device includes a front polarizer and a transparent conductive layer on a top surface of the front polarizer. The LCD device also includes a color filter layer coupled to a bottom surface of the front polarizer and a rear polarizer at a bottom of a stack of the LCD. The LCD device further includes a liquid crystal layer between the rear polarizer and the color filter layer.

In yet another embodiment, a portable electronic device is provided. The electronic device includes a touch panel and an LCD (liquid crystal display. The LCD includes a front polarizer coupled to a bottom surface of the touch panel, a transparent conductive layer on a top surface of the front polarizer, and a color filter layer coupled to a bottom surface of the front polarizer. The LCD also includes a rear polarizer at a bottom of a stack of the LCD and a liquid crystal layer between the rear polarizer and the color filter layer.

In still yet another embodiment, a portable electronic device is provided. The device includes a touch panel and an LCD (liquid crystal display. The LCD includes a front polarizer coupled to a bottom surface of the touch panel, and a color filter layer coupled to a bottom surface of the front polarizer. The LCD also includes a transparent conductive layer on a top surface of the color filter and coupled between the front polarizer and the color filter. The LCD further includes a rear polarizer at a bottom of a stack of the LCD and a liquid crystal layer between the rear polarizer and the color filter layer.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

The present disclosure provides a thin conducting layer, such as silver nano wire (AGNW) mesh, to shield display noise coupled from a TFT layer of the LCD into a touch panel. The thin conducting layer may be placed at a different location than a conventional ITO layer in a typical IPS LCD. For example, the AGNW may be placed on the top surface of a front polarizer of a LCD. In contrast, the conventional ITO layer is typically placed on a top of a color filter (CF) glass or layer. The present disclosure potentially enables a thinner product design to meet both the shielding requirement and light transmission requirement.

Figure 1A:
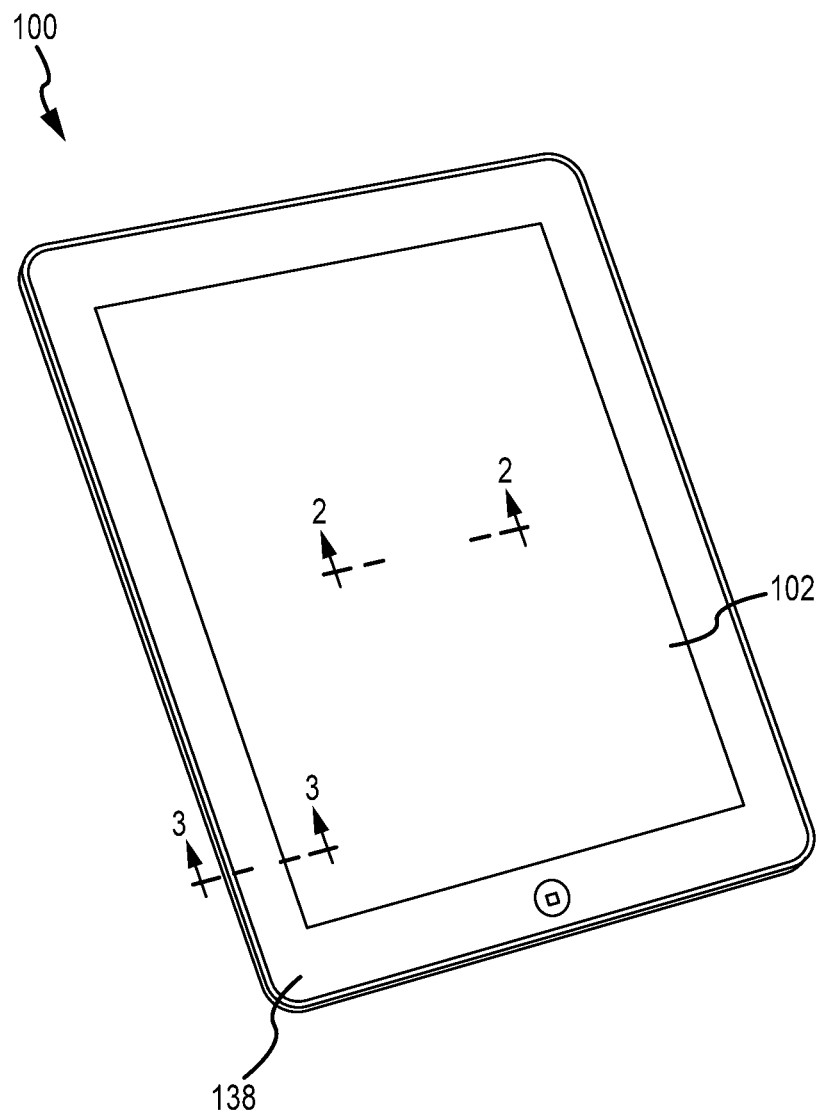
FIG. 1A illustrates a perspective view of an IPAD.
Figure 1B:
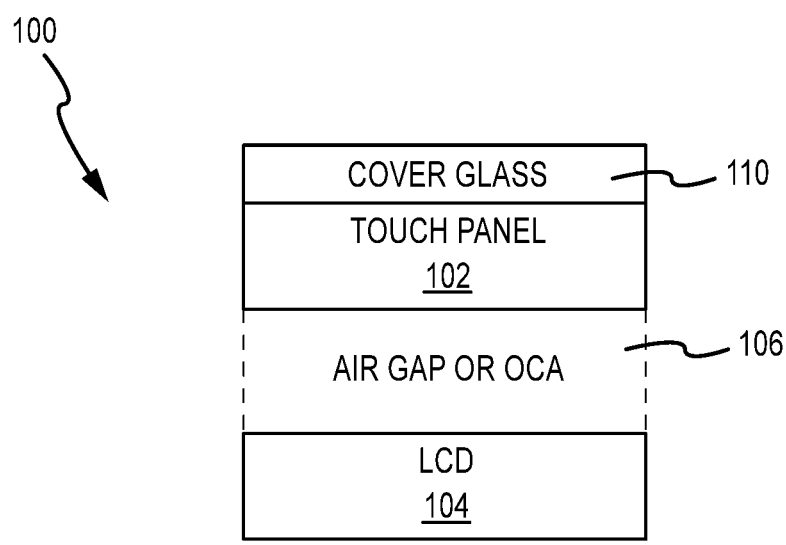
FIG. 1B illustrates a simplified cross-sectional diagram for a touch screen display (Prior Art).
Figure 1C:
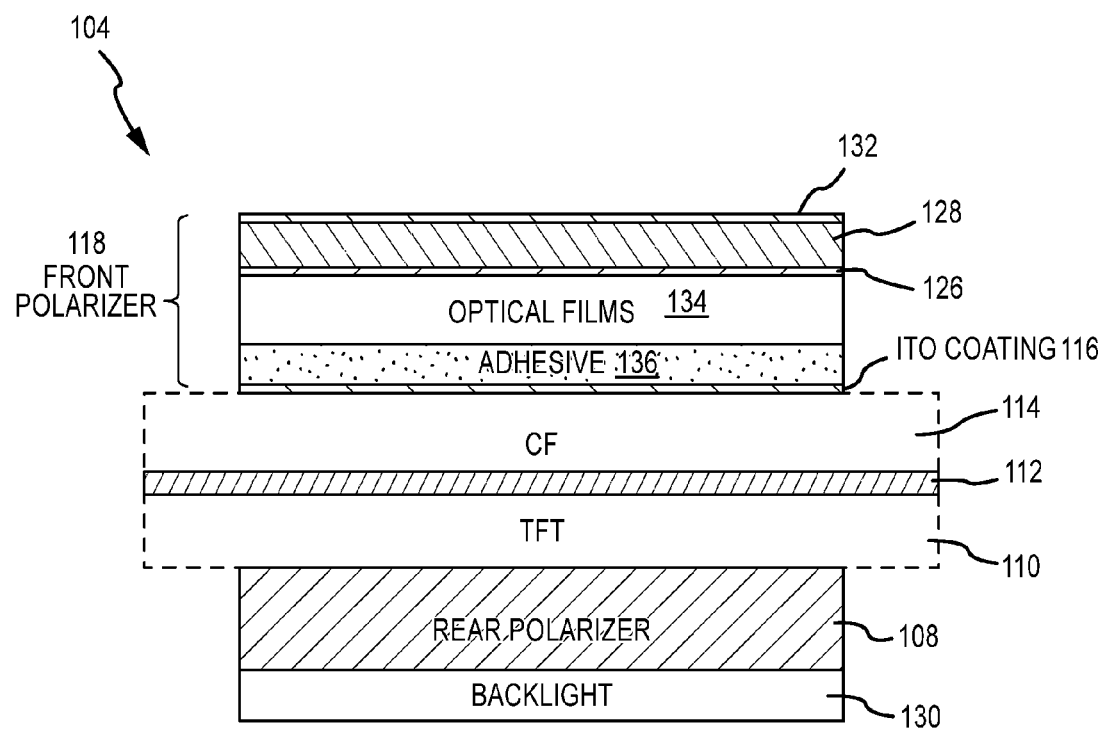
FIG. 1C illustrates a cross-section of conventional IPS LCD (Prior Art).
Figure 2A:
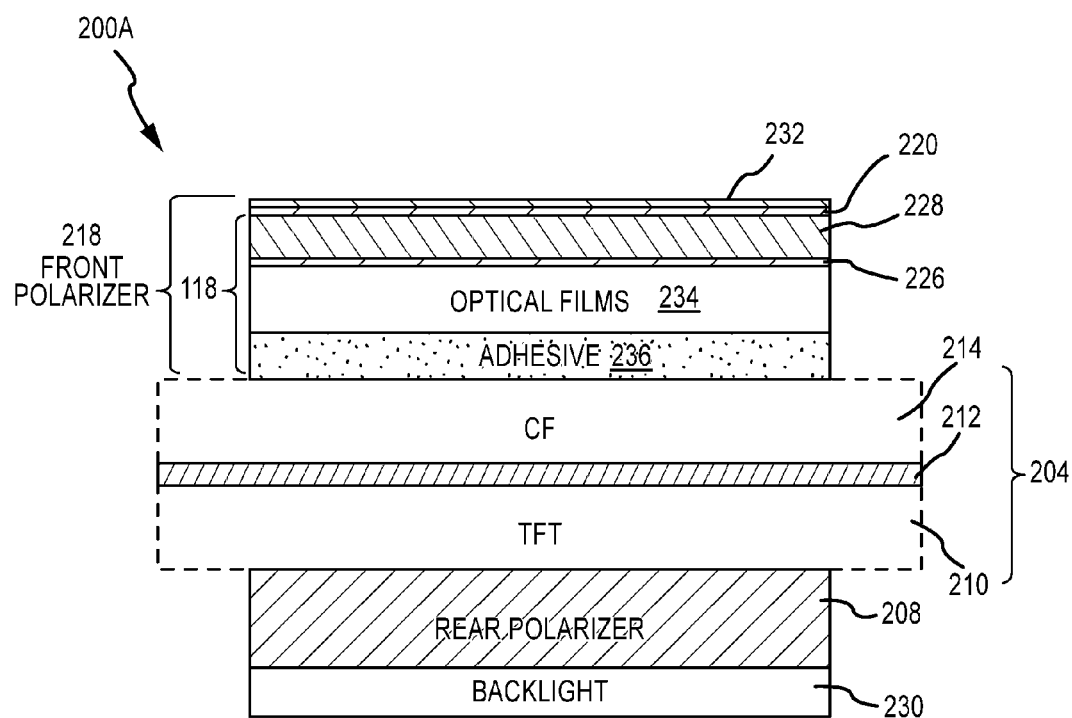
FIG. 2A illustrates a stack of an IPS LCD with a transparent conducting layer in a first embodiment.

FIG. 2A illustrates a stack of an IPS LCD with a transparent conducting layer in a first embodiment. An IPS LCD 200A includes a metal mesh coated front polarizer 218 formed from a transparent conducting layer 220, which may be silver nano wire (AGNW) ,on the top of a polarizer 118. Thin layers, such as hard coating, anti-glare (AG) coating, anti-fingerprint (AF) coating, or/and anti-reflection (AR) coating 232, may be placed on top of the AGNW to meet optical and reliability performance goals. The AGNW 220 may be a mesh. The mesh may be embedded in a dielectric matrix or a polymer matrix to provide more light transmission through the polarizer 218 than a solid film. The nano wires may have a few nanometers in diameter and tens of microns in length. The nano wires create a mesh that may not substantially degrade the light transmittance. A size of the mesh varies with the density of the nano wires in the polymer matrix. When the density of the nano wires increases, the sheet resistance of the AGNW coating may decrease and the mesh size may also decrease.

The polarizer 118 may include an adhesive layer 236, one or more optical films 234, a PVA with iodine layer 226, and a plastic film 228, such as TAC, COP, PET, or PMMA film among others. The plastic film 228 is a base film that protects the polarizer 118.

The IPS LCD 200A also includes an LCD 204. The LCD may have a backlight 230, a rear polarizer 208, a TFT layer 210, liquid crystal layer 212, and a CF layer or glass 214, similar to the conventional IPS LCD 104. However, the IPS LCD 200A does not include an ITO coating in this embodiment. The backlight 230 is configured to provide white light to the rear polarizer 208. For example, the backlight 230 may include a blue LED emitting blue light and red and green phosphors that emit red and green light when excited by the blue light from the blue LED. When all emitted colors are mixed, a white back light may be produced. Alternatively, the backlight LED 230 may include a blue LED emitting blue light and a yellow phosphor that emit yellow light when excited by blue light from the blue LED, again resulting in a white back light upon mixing. In a further example, the backlight 230 may also include a blue LED and red and green quantum dots to generate a white back light.

The LCD 204 also includes electrodes (not shown). The electrodes may be combined with the TFT layer. Each pixel of the LCD 204 has a corresponding transistor or switch for controlling voltage applied to the liquid crystal. The liquid crystal layer 212 may include rod-shaped polymers that naturally form into thin layers with a natural alignment. The electrodes may be made of a transparent conductor, such as an indium-tin-oxide material (commonly referred to as "ITO"). The two polarizers 218 and 208 are set at right angles. Normally, the LCD 204 may be opaque. When a voltage is applied across the liquid crystal layer 212, the rod-shaped polymers align with the electric field and untwist. The voltage controls the light output from the front polarizer 218. For example, when a voltage is applied to the liquid crystal layer 212, the liquid crystal layer 212 rotates so that there is light output from the front polarizer 218.

Transistors in the TFT layer 210 may take up only a small fraction of the area of each pixel; the rest of the silicon film may be etched away or essentially removed to allow light to pass through. Polycrystalline silicon may sometimes be used in displays requiring higher TFT performance. However, amorphous silicon-based TFTs are the most common technology due to its lower production cost. The silicon layer for the TFT-LCD is typically deposited over a glass substrate by using a PECVD process.

Figure 2B:
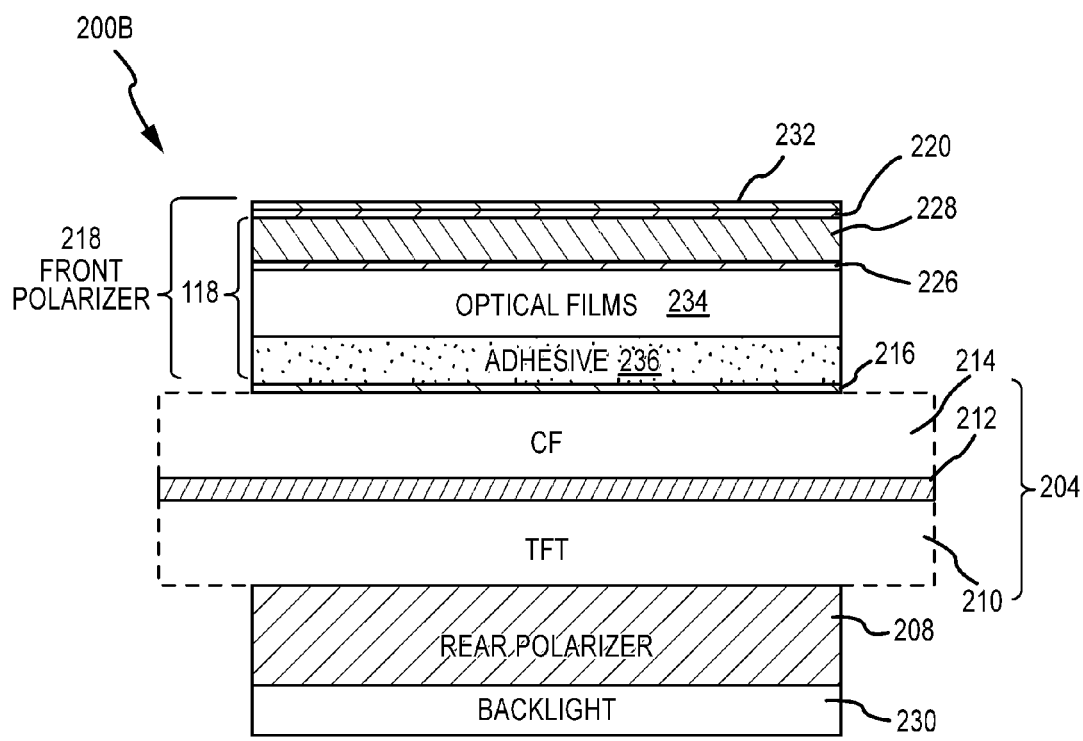
FIG. 2B illustrates a stack of an IPS LCD with a transparent conducting layer in a second embodiment.

FIG. 2B shows that a thin ITO coating 216 may be included between the CF glass 214 and the front polarizer 218 in the IPS LCD 200B in a second embodiment. In this embodiment, the thin ITO coating 216 may be placed on the top of the CF glass 214. The ITO coating 216 may help with reducing ESD during processing. The ESD may be generated when stacking the front polarizer with the CF glass 214. The thickness of the ITO coating 216 may be in a range of 10 nm to 30 nm so that the light transmission remains relatively high. Alternatively, an anti-static coating may be added on top of the CF glass 214 during integrating the front polarizer and the CF glass 214 to help reduce ESD. The anti-static coating may be removed prior to stacking the front polarizer on top of the CF glass 214.

In this particular embodiment, the AGNW coating 220 may be placed on a front surface or top surface of the front polarizer 218, rather than being placed between the front and rear polarizers. The AGNW may degrade a contrast ratio of the LCD, due to depolarization properties of the AGNW. The contrast ratio of a display refers to the ratio of the brightest white to the darkest black that the display may produce. Typically, a higher contrast ratio is associated with better image quality, such as improved clarity and/or brightness. "Light depolarization," as used herein, refers to the conversion of polarized light into unpolarized light. AGNW has a negative refraction index, which may depolarize light passing therethrough and so negatively impact the display's contrast ratio. By placing the AGNW coating 220 on the top surface of the front polarizer 218, such depolarization may be minimized.

The AGNW 220 may be pre-coated onto the transparent plastic film 228, such as triacetycellulose (TAC), cyclo olefin polymer (COP), Poly(methyl methacrylate) (PMMA) or poly(ethylene terephthalate) (PET), polyethylene naphthalate (PEN), polyether sulfone (PES), glass, reinforced glass, polycarbonate (PC), or mixtures of the foregoingthereof. The AGNW coated plastic film may be laminated with polyvinyl alcohol (PVA) which may be iodine doped and/or other optical films or compensation films for the polarizer 218. The optical films or compensation films may compensate for phase difference. The doped PVA essentially absorbs light having particular directions. The AGNW 220 on the outer surface of the front polarizer 218 also does not de-polarize the light between the crossed polarizers of the LCD.

The AGNW 220 may have a sheet resistance ranging from 5 ohm/sq to 600 ohm/sq. The conducting layer, for example, the AGNW 220 may have sheet resistance less than 300 ohm/sq, or less than 150 ohm/sq. The AGNW 220 may have a high light transmittance (e.g. greater than 97% in the stack), a low light reflectance (e.g. less than 0.5%), and a low haze (e.g. less than 0.3%). In a particular embodiment, the AGNW coating 220 may have a light transmittance of 99% at an approximately 150 ohm/sq sheet resistance. In contrast, ITO coatings typically have a sheet resistance ranging from 500 to 1000 ohm/sq for the same transmittance.

Although the above example uses AGNW, it will be appreciated by those skilled in the art that the transparent conductive layer may also be nano wires including other metals, such as gold (Au), palladium (Pd), platinum (Pt), nickel (Ni), copper (copper), aluminum (Al), tin(Sn), and titanium (Ti) or a combination of these metals.

Figure 3A:
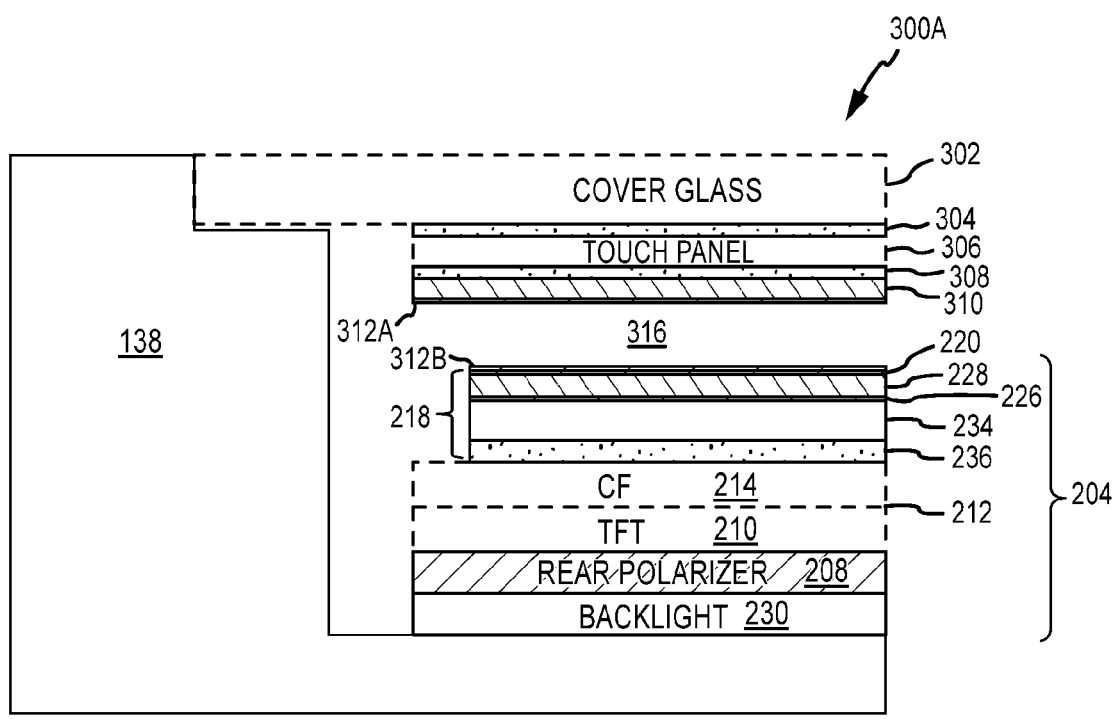
FIG. 3A illustrates a first example touch screen display with a transparent conducting layer as shown in FIG. 2A or 2B.
Figure 3B:
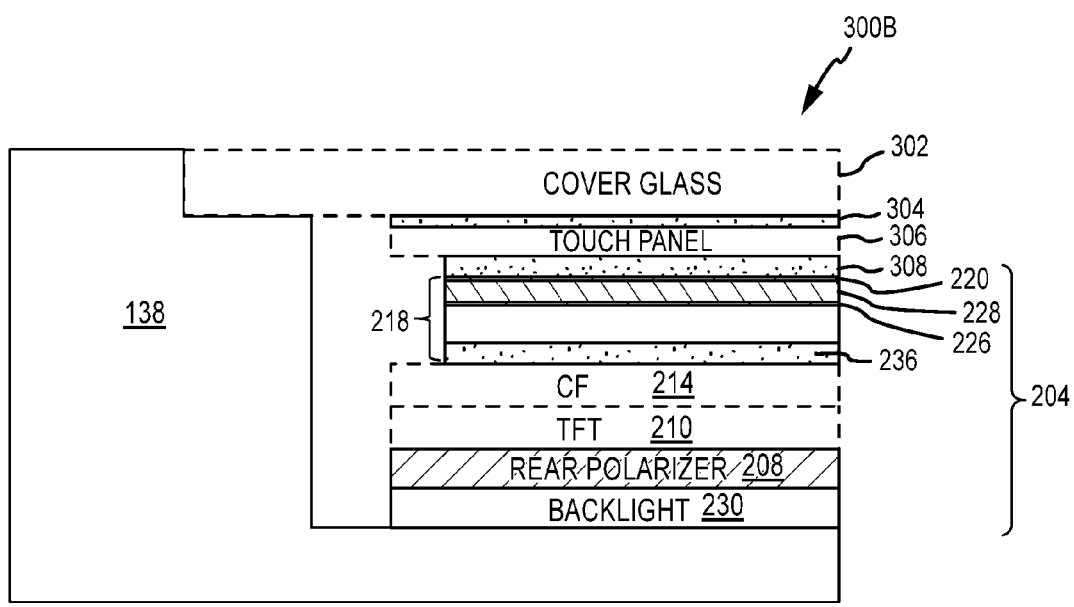
FIG. 3B illustrates a second example touch screen display with a transparent conducting layer as shown in FIG. 2A or 2B.

FIG. 3A illustrates a first example touch screen display with a transparent conducting layer as shown in FIG. 2A. Touch screen display 300A includes a front polarizer 218 that has a transparent conducting layer or AGNW 220 on the top of a conventional front polarizer 118. Touch screen display 300A may also include an anti-reflection (AR) coating 312 on the top of the AGNW 220. Touch screen display 300A may further include a cover glass 302 bonded to a top surface of a touch panel 306 using a first adhesive 304. Touch screen display 300A may also include a plastic film (e.g. TAC) 310 bonded to a bottom surface of the touch panel 306 using a second adhesive 308. The first adhesive 304 and the second adhesive 308 may be acrylic, polyurethane, epoxy and the like. The adhesives may also be double side adhesive tapes. Touch screen display 300A may further include an anti-reflective (AR) coating 312A on a bottom surface of the plastic film (e.g. TAC) 310. FIGS. 3A and 3B show housing 138 coupled to the cover glass 302. Note that there may be a gap between the housing 138 and the edges of the touch panel 306 and the LCD 204. Alternatively, the housing 138 may contact the edges of the touch panel and the LCD 204.

Touch screen display 300A may also include an air gap 316 between two opposite AR coatings, i.e. the AR coating 312A on the bottom surface of the plastic film 310 and the AR coating 312B on the top of the transparent conducting layer or AGNW 220. The AR coatings 312A and 312B may help reduce the reflections due to the air gap 316. A reflection may generally occur at an interface between two materials or two layers with different refractive indexes. The reflection typically increases with the refractive index difference between the two materials. Air has a large difference in refractive index from the plastic film (e.g. TAC) 310. The AR coating has a refractive index that is in between air and the plastic film, and so may reduce reflections otherwise caused at the air-film junction. The LCD is similar to 200A or 200B, as shown in FIG. 2A or FIG. 2B and described above.

It will be appreciated by those skilled in the art that TAC 310 may be replaced with another transparent material, such as cyclo olefin polymer (COP), Poly(methyl methacrylate) (PMMA) or poly(ethylene terephthalate) (PET), polyethylene naphthalate (PEN), polyether sulfone (PES), glass, reinforced glass, polycarbonate (PC), or a mixture thereof FIG. 3B illustrates a second example touch screen display with a transparent conducting layer as shown in FIG. 2A. Touch screen display 300B includes a cover glass 302, a first adhesive layer 304, a touch panel 306, and a second adhesive layer 308, similar to touch screen display 300A. Unlike touch screen display 300A, there is no air gap in this embodiment such that the second adhesive layer 308 may be placed on the top of the transparent conducting layer (e.g. AGNW) 220, which is in turn placed on the top surface of the front polarizer 218. Note that there are no anti-reflection coatings 312A and 312B on either the bottom of the adhesive layer 308 or the top of the AGNW 220. The TAC 310 is also absent in FIG. 3B such that the second adhesive layer 308 may directly bond to the AGNW 220.

It is known in the art that the ITO coating has a very high refractive index. Thus, the ITO may contribute a large portion to a total reflection from the front polarizer or the display due to a large difference between the refractive indexes of the ITO and the polarizer and/or display.

Figure 4:
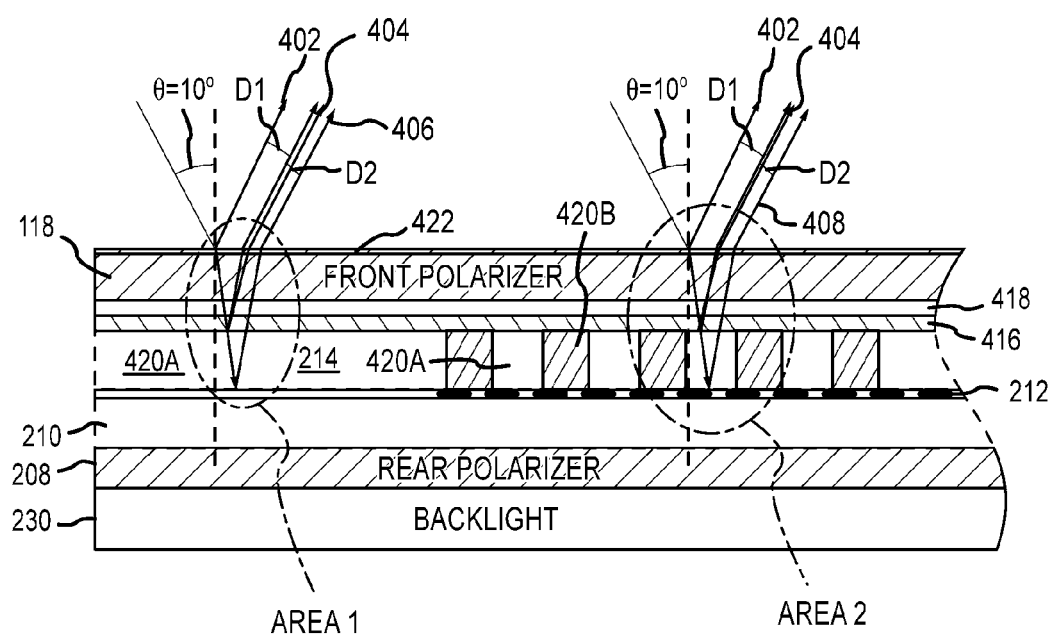
FIG. 4 illustrates sample light reflections from various layers of an IPS LCD with an ITO coating on top of a CF glass.

FIG. 4 illustrates sample light reflections from various layers of an IPS LCD with a relatively thick ITO coating. FIG. 4 illustrates a similar stack to FIG. 10. The ITO coating 416 is similar to the conventional ITO coating 116, but has a larger thickness than the conventional ITO coating 116. There may be three main reflections from different surfaces or interfaces. Ray 402 illustrates reflection from a top surface of an anti-reflection (AR) layer 422. Ray 404 illustrates reflection from the interface between the CF glass 214 and the ITO coating 416.

The CF glass 214 includes a number of color filters 420B arranged in subpixels, such as a red color filter, a green color filter, and a blue color filter. The red, green, and blue filters transmit a light having a specific wavelength of white light incident from the backlight source 230. The filters 420B transmit wavelengths of light corresponding to the color of each filter, and absorb other wavelengths. Accordingly, a light loss is generated in the liquid crystal display by the color filters. Each color filter is separated from another color filter by a black matrix 420A, which includes ink that absorbs all color, acting like a black body.

A large portion of the black matrix 420A is near an outer end of the CF glass 214, while the CF filters 420B and a small portion of the black matrix 420A between the CF filters 420B are in the middle portion of the CF glass 214.

Turning to the left side of FIG. 4, ray 406 illustrates reflection from the interface between the black matrix 420A of the CF glass 214 and liquid crystal layer 212. Now, turning to the right side of FIG. 4, ray 408 illustrates reflection from the interface between the color filters 420B of the CF glass 214 and the liquid crystal layer 212.

The ITO contributes to a large portion of the total reflection of the polarizer. When the ITO becomes thicker, the reflection of the ITO becomes greater. Based upon modeling, reflections are estimated and exemplary results are presented below.

In an alternative embodiment, the ITO may be replaced by a transparent conductive layer, such as an AGNW layer, i.e. the AGNW layer on top of the CF glass 214. The AGNW layer may provide better light transmittance, low reflectance than the ITO while having a low sheet resistance to help shield the noise from the TFT to the touch panel. Unlike the embodiments as shown in FIGS. 2A-2B, 3A-3B, the image quality, such as clarity and/or brightness, may depend upon the AGNW depolarization properties.

Figure 5:
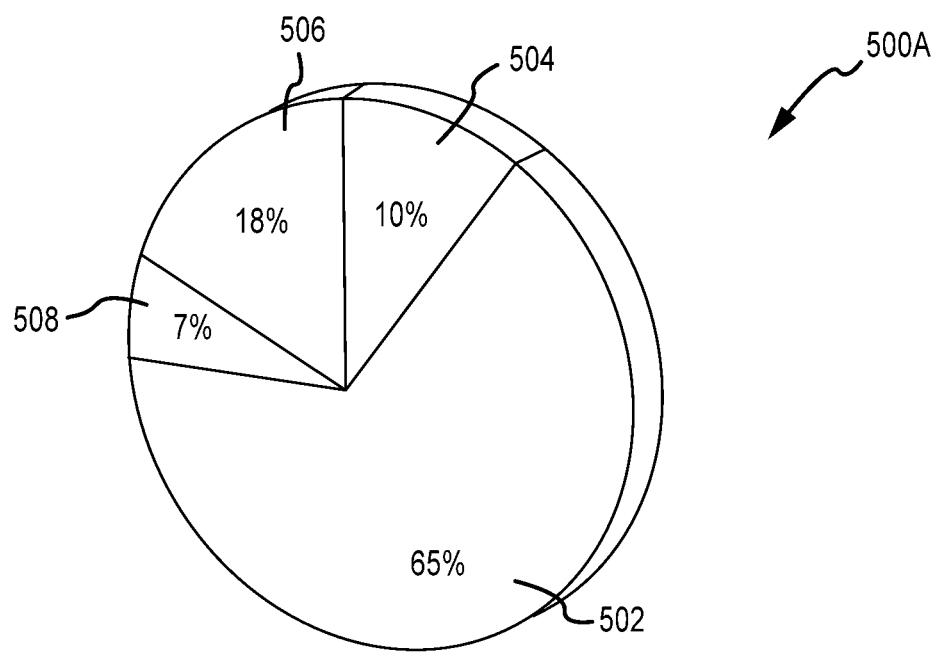
FIG. 5 illustrates a sample total reflection contributed by various reflections from different coatings of area 1 of FIG. 4.

FIG. 5 illustrates a sample total reflection contributed by various reflections from different coatings of area 1 of FIG. 4. As discussed, earlier, the reflection of the ITO 416 varies with thickness or sheet resistance of the ITO. By using the sheet resistance of about 500 to 600 ohm/sq for the ITO, its reflection is estimated. This sheet resistance may be adequate for a relatively thick product, but not low enough for thinner display products. In a particular embodiment, a total reflection 500A includes about 65% reflection 502 from the ITO coating 416, about 10% reflection 504 from the AR coating 422, about 18% reflection from the black matrix 420A, and about 7% reflection from the CF filters 420B. Accordingly, the ITO reflection constitutes a major portion of the total reflection 500A.

Figure 6:
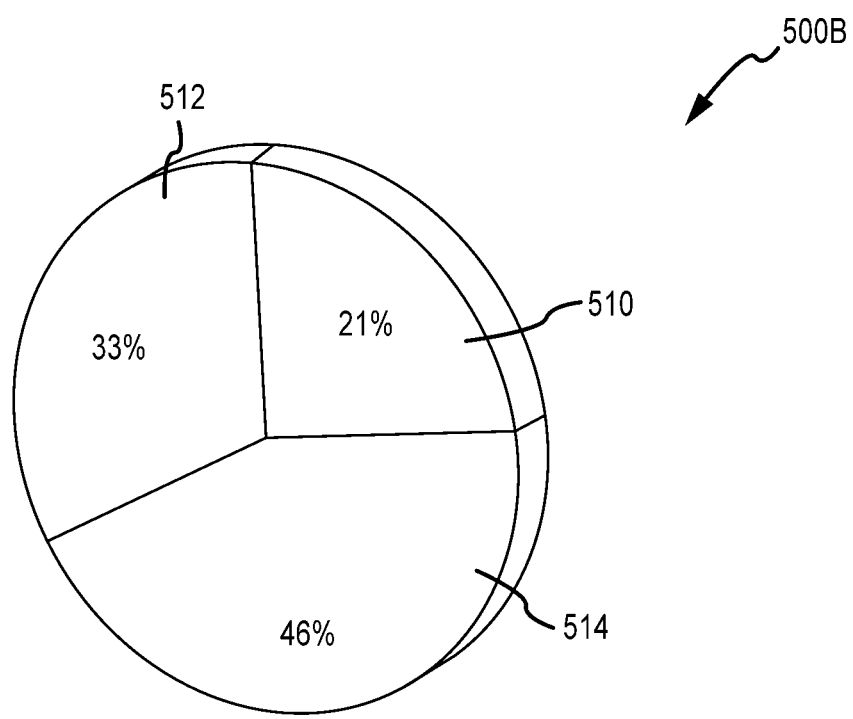
FIG. 6 illustrates a sample total reflection contributed by various reflections from different coatings of area 2 of FIG. 4.

As discussed above, the color filters 420B and the black matrix 420A are in the middle portion of the display so that a combined reflection from the black matrix and the color filters may represent the reflection for a product of area 2 of FIG. 4. FIG. 6 illustrates a sample total reflection contributed by various reflections from different coatings of area 2 of FIG. 4. The reflection is obtained based upon modeling using the sheet resistance of about 500 to 600 ohm/sq for the ITO 416. The total reflection includes about 46% reflection from the ITO coating 416, about 33% reflection from the top AR coating 422, and about 33% reflection from a combination of black matrix 420A and CF filters 420B. Note that the reflection from the ITO coating 416 is still the largest contributor to the total reflection.

Generally, transmittance increases with sheet resistance for the ITO. The sheet resistance increases with decreasing thickness of the ITO 416, while the transmittance decreases with the increasing thickness due to light absorption in the ITO coating. In one embodiment, the ITO coating may be about 50 nm thick and have a sheet resistance of about 150 ohm/sq and a light transmittance of about 90%. In another embodiment, the ITO coating may be 20 nm thick and have a sheet resistance of about 300 ohm/sq and a light transmittance of about 92%. In a further embodiment, the ITO coating may be 15 nm thick and have a sheet resistance of about 600 ohm/sq and a light transmittance of about 97%. These values may vary with deposition process.

In contrast, the transmittance for the AGNW may not vary substantially with the sheet resistance, and may be above 97% for all the sheet resistances. Compared to the ITO, the AGNW may be thinner, for example about 10 nm or less, which enables to deliver thinner touch screen displays. The AGNW may be embedded in a polymer matrix which may be precoated on a plastic film, such as a TAC film. The AGNW with the polymer matrix may have a thickness less than 1 μm.

The AGNW may have less than 0.5% reflectance, which is much lower than the ITO. The reflectance for the AGNW may have less dependence upon the sheet resistance. In contrast, the reflectance for the ITO may increase with decreasing sheet resistance or increasing thickness, as the transmittance decreases with the increasing thickness due to absorption. Reflectance for the ITO under polarizer, i.e. for reflections as shown in FIG. 4 by Ray 404, may be lower than the ITO, because the reflections may be reduced by the polarizer 218 on top of the ITO or AGNW.

In a particular embodiment, the haze may be below 0.5% or even below 0.3%. The reflectance for the AGNW may be below 0.5% or even 0.3%. The transmittance may be above 97%. An extra margin on the shielding to display capacitive noise may be achieved by adding the AGNW 220 on the top of the front polarizer and removal of the ITO coating 416 or reducing the ITO coating 416 to a minimum thickness.

Based upon the above results, it is noted that the ITO's optical properties are not adequate when the shielding requirement is met. Generally, lower sheet resistance provides more effective shielding. Less than 150 ohm/sq sheet resistance may be needed for sufficient shielding to noise for thinner display products. This requires the ITO layer to be relatively thick, such as about 50 nm thick or larger thickness, especially for ITO deposited at lower temperature, such as lower than 150° C. As a result, the thick ITO layer is highly reflective. The thick ITO layer 416 may also absorb blue light and transmit light in more yellow color. The loss of light transmittance may also be as high as 8% to achieve 150 ohm/sq sheet resistance. Practically, the ITO sheet resistance may be kept at a higher level as a trade-off between touch performance, display power, and display optical performance.

As demonstrated above, the thinner conducting layer (such as AGNW) may have both a low sheet resistance, such as about 150 ohm/sq or lower, and a very high transmittance, such as about 97% or higher, low reflectance, such as about 0.5% or lower, and a low haze, such as about 0.3% or lower. The AGNW 220 may be about 10 nm thick or even thinner. The AGNW 220 is much better than the conventional ITO layer 416, because the AGNW is thinner, less reflective, and has higher transmission than the ITO, while having a low sheet resistance. This low sheet resistance provides an extra margin which helps tolerate a higher level of capacitive noise from the display, such that more power saving can be achieved.

Figure 7:
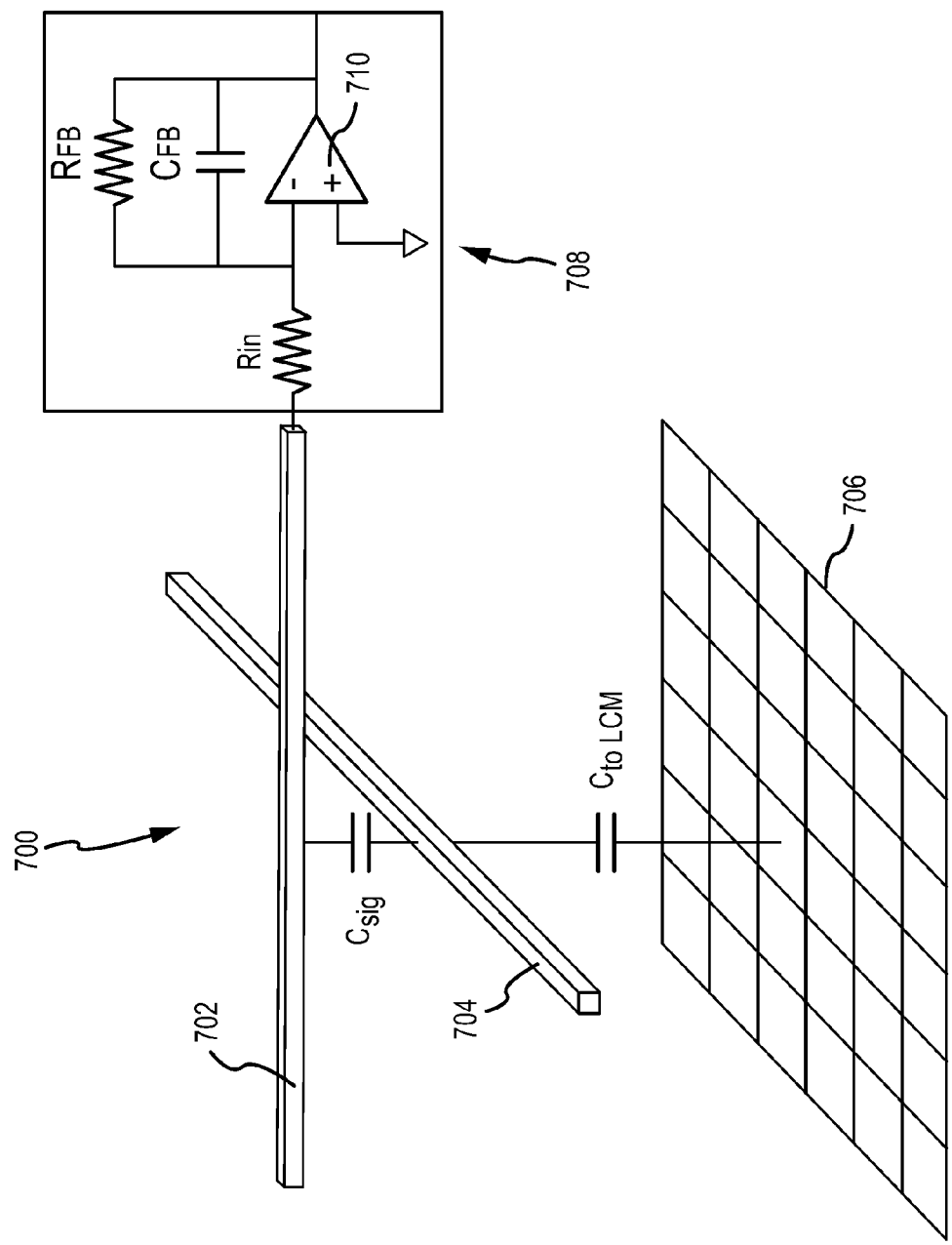
FIG. 7 is a simplified system diagram for a touch screen display in an embodiment.

FIG. 7 is a simplified system diagram for a touch screen display in an embodiment. System 700 includes an LCD 706, sense electrode 702 and drive electrode 704 for a touch panel (not shown), and a sense amplifier 708. The touch panel may capacitively sense touch and may have a capacitance $C_{sig}$ between a sense electrode 702 and a drive electrode 704. The $C_{sig}$ may represent a touch signal from a user. FIG. 7 depicts an exemplary touch node, such as one defined by an intersection of sense electrode 702 and drive electrode 704. The touch panel may include a number of such nodes. In an alternative embodiment, the node may be defined by other geometries than the intersection. The sense amplifier 708 is an exemplary receiving channel circuitry for the touch panel, which senses the total signal transmitted onto the drive electrode 704 through $C_{sig}$.

A typical active matrix LCD is switched line-by-line, at a line frequency ranging from kHz to MHz. This switching electrical field and its harmonics may be capacitively coupled into sense electrode 702 and drive electrode 704, which causes inaccurate touch sensing, or total disfunction. The liquid crystal module (LCM) noise from the TFT and the LCM noise coupled into the sense amplifier 708 may be measured or monitored by an oscilloscope. The LCM noise may be coupled by a capacitance $C_{toLCM}$ existing between the IPS LCD 104 and the touch panel 102. The sense electrode 702 may coupled to the sense amplifier 708, which may include an input resistor with an input resistance $R_{FB}$ at least one feedback resistor with a feedback resistance $R_{FB}$, a feedback capacitor with a feedback capacitance CFB, and operational amplifier 710 in some embodiment. The sense amplifier 708. FIG. 7 shows the general case when both resistive and capacitive feedback elements are utilized. The signal is coupled into the operational amplifier 710 as an inverting input. The non-inverting input to the operational amplifier 710 may be coupled to ground or a reference voltage.

Figure 8A:
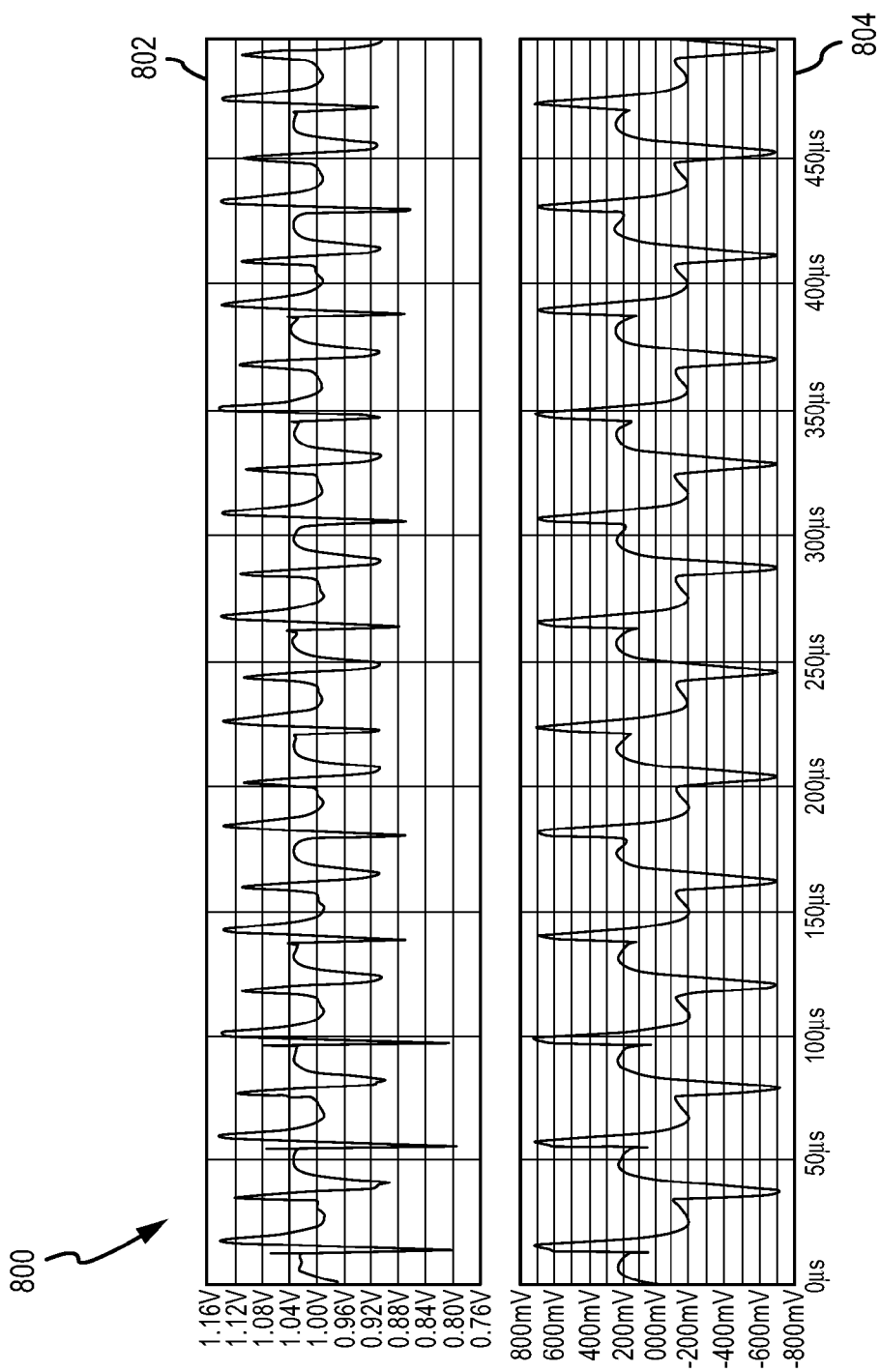
FIG. 8A illustrates LCM noise and the LCM noise coupled into the sense amplifier for the touch screen display of FIG. 7.
Figure 8B:
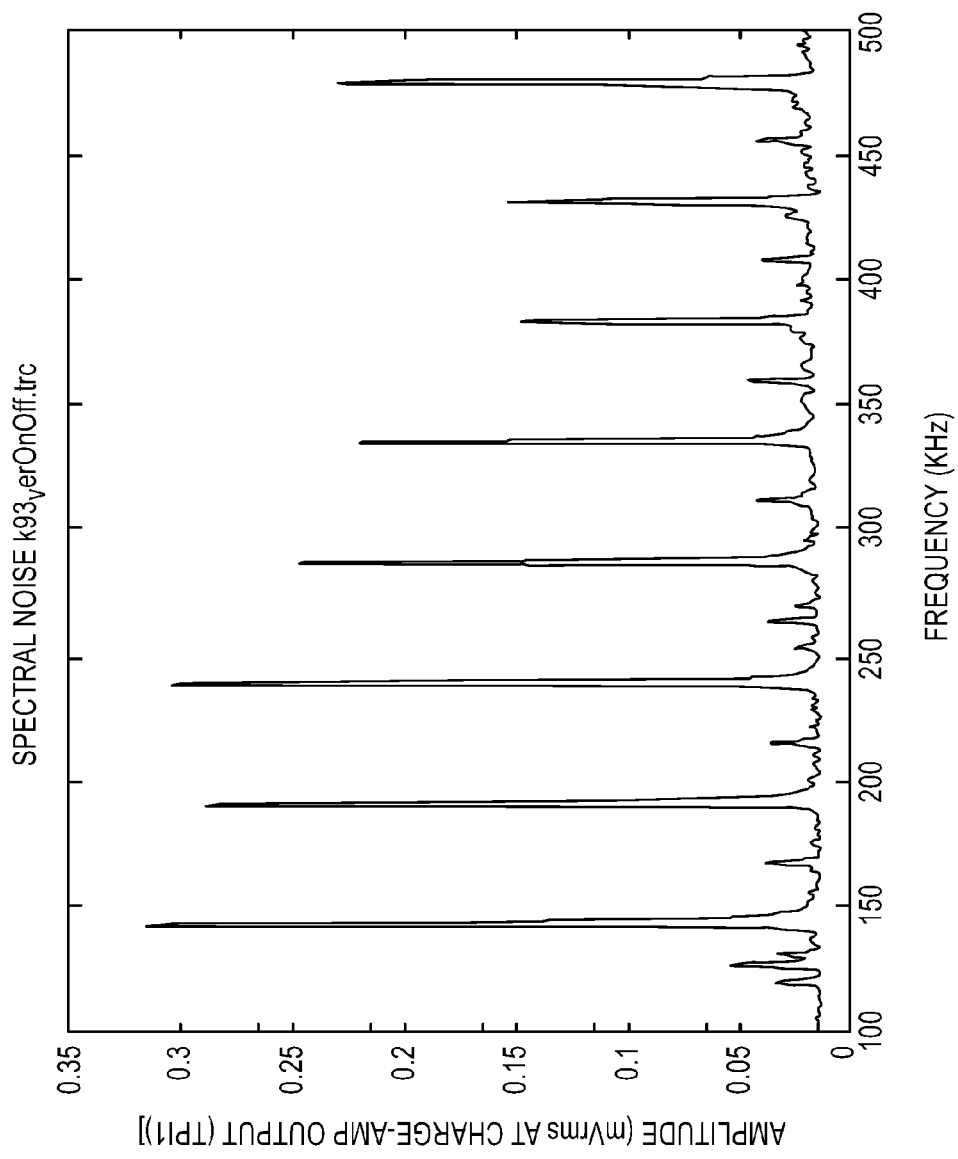
FIG. 8B shows spectra for the LCM noise of FIG. 8A.

FIG. 8A illustrates sample LCM noise from the LCD and the LCM noise coupled into the sense amplifier 708 of FIG. 7. The ITO coating is connected to a testing equipment ground. The sheet resistance of the ITO coating varies with the touch panel, and is normally in the range of 400 ohm/sq to 700 ohm/sq. As shown, trace 802 for LCM noise coupled into the sense amplifier 708 has similar noise patterns to trace 804 for LCM noise generated from the TFT source. FIG. 8B shows spectra for LCM noise of FIG. 8A. As shown, the LCM noise may be 0. 3 $mV_{rms}$ in the frequency ranging from 100 kHz to 500 kHz. This is in the same range as the line frequency range. The noise may be much higher than the exemplary 0.3 $mV_{rms}$, depending upon measurement conditions, the touch panel and display. The noise may be high enough to interfere the drive and thus may need to be reduced.

Proper grounding may help reduce the noise. In a particular embodiment, the polarizer may serve as an effective noise shielding layer and may provide ESD protection. The noise may be reduced by use of conductive tapes attached to a conductive layer such as ITO or AGNW. The conductive tapes may include copper. The noise may be further reduced by varying the attachment locations of the copper tapes to the AGNW or ITO.

Figure 9A:
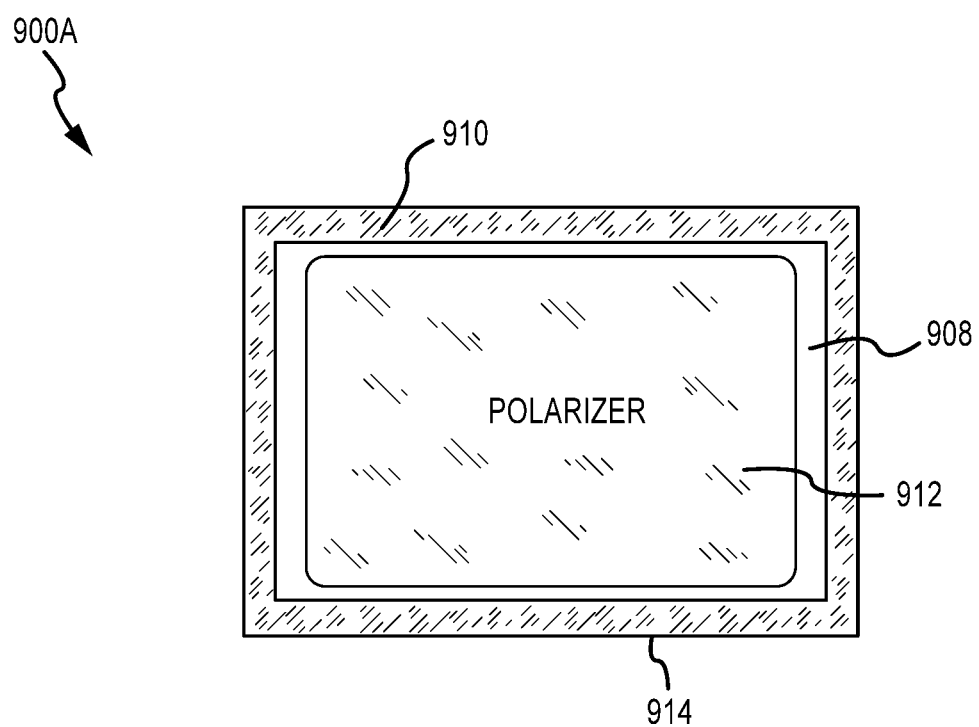
FIG. 9A illustrates a top view of a first grounding configuration of a front polarizer with ITO as shown in FIG. 4.

FIG. 9A illustrates a top view of a first sample grounding configuration of a front polarizer with an ITO as shown in FIG. 4. Grounding configuration 900A includes an ITO layer 908 under a polarizer 912 for grounding. In a particular embodiment, the ITO layer 908 may be on the outer surface of the CF glass of the LCD, as shown in FIG. 4. The polarizer 912 and the ITO layer 908 are in a substantially rectangular shape. The ITO layer 908 extends outwardly from the polarizer 912 from each side of the rectangle. In this configuration, a conductive tape 910 may contact the ITO layer 908 along four edges of the ITO layer 908.

Figure 9B:
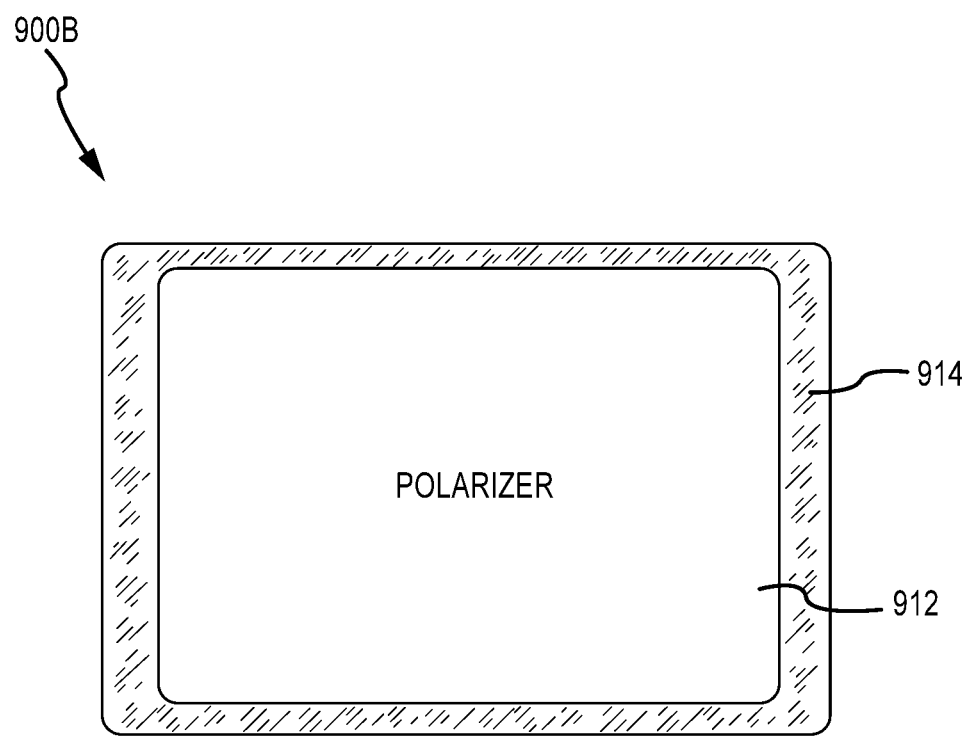
FIG. 9B illustrates a top view of a second grounding configuration of a front polarizer without any conducting layer and/or grounding.

FIG. 9B illustrates a top view of a second sample grounding configuration of a front polarizer. Grounding configuration 900B removes the ITO layer 908, and thus has no need for the copper tape. Glass 914 covers the polarizer 912. This is a configuration without any grounding.

Figure 9C:
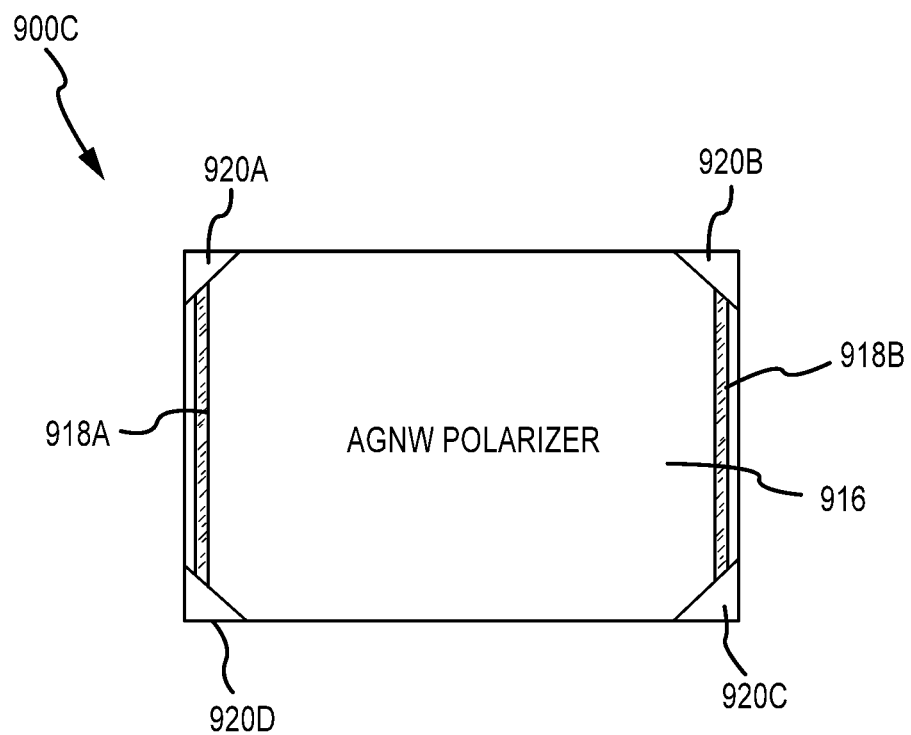
FIG. 9C illustrates a top view of a third grounding configuration of a front polarizer with AGNW as shown in FIG. 2A or 2B.

FIG. 9C illustrates a top view of a third sample grounding configuration of a front polarizer with an AGNW mesh or an AGNW polarizer as shown in FIG. 2A or 2B. Configuration 900C includes an AGNW polarizer 916, which is in a substantially rectangular shape. The AGNW may be placed on the outer surface of the front polarizer so that the AGNW may be easily grounded. Conductive tapes 920A-D, such as copper tapes, may be placed at the four corners and on top of the AGNW polarizer 916 to contact the AGNW on the outer surface of the polarizer. Although reference is generally made herein to copper tape, it should be appreciated that any suitable conductive tape may be used.

Figure 9D:
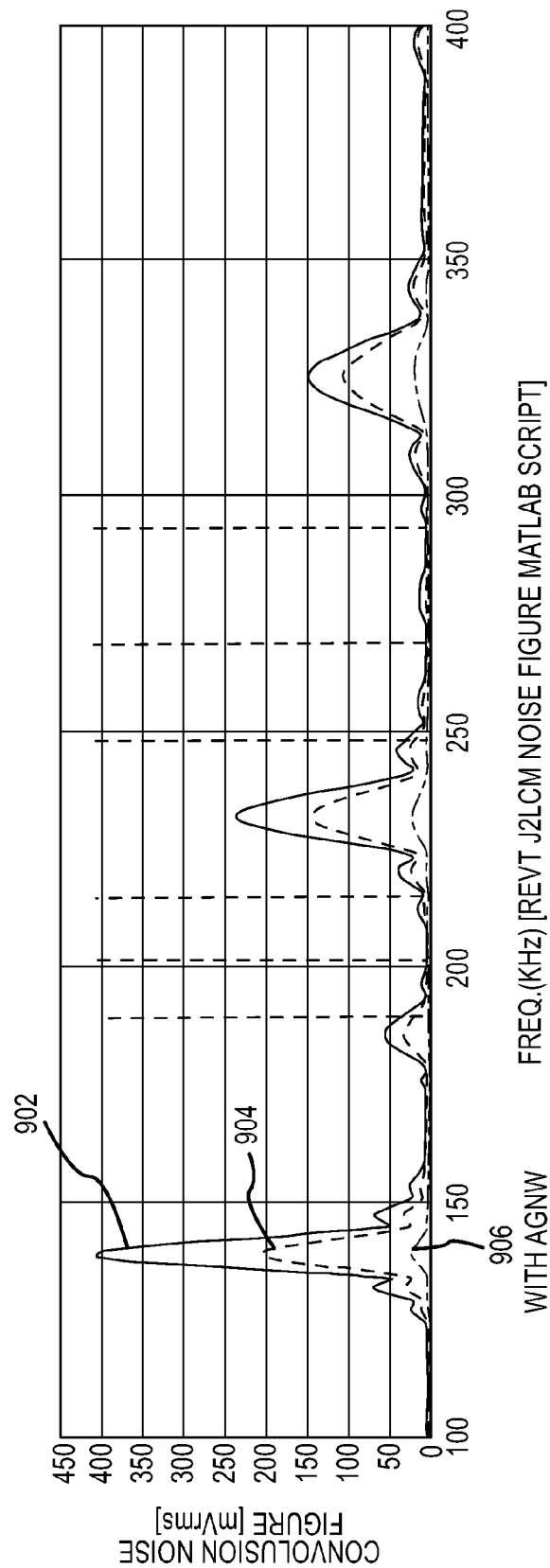
FIG. 9D illustrates a comparison of sample noises of the grounding configurations of FIGS. 9A-9C.

Two conductive bars 918A and 918B may contact two opposite edges of the AGNW polarizer 916. For example, conductive bar 918A may contact an edge of the AGNW polarizer 916 and may connect two conductive tapes 920A and 920D at two neighboring corners. Another conductive bar 918B may contact an opposite edge of the AGNW polarizer 916 and may connect two conductive tapes 920B and 920C at two other neighboring corners. The conductive bars 918A and 918B may include or be formed from a conductive paste, such as silver paste. The AGNW is coated on the polarizer and thus has the same size as the polarizer The grounding configurations 900A, 900B, and 900C have different grounding effects. To compare the grounding effects, noise may be measured with a spectrum analyzer, for example, Tektronix 3308A Spectrum Analyzer. FIG. 9D illustrates comparisons of noise from a polarizer with an ITO (grounding configuration 900A), an AGNW polarizer (grounding configuration 900C), and a polarizer without grounding (grounding configuration 900B) in an embodiment. Note that curve 902 for the polarizer without ITO or AGNW shows the highest noise level, which generally is due to the fact that no grounding was provided to the polarizer. Curve 904 for the polarizer with an ITO on the outer surface of the CF glass reveals higher noise than the AGNW polarizer, but lower noise that the polarizer without ITO. As shown, the ITO coating on the outer-surface of CF glass provides a certain level of shielding to the display capacitive noise, especially when properly grounded. Curve 906 for the AGNW polarizer illustrates the lowest noise level, generally because the AGNW may have a lower sheet resistance than the ITO at a relatively thin coating, such as 10 nm thick.

Figure 10A:
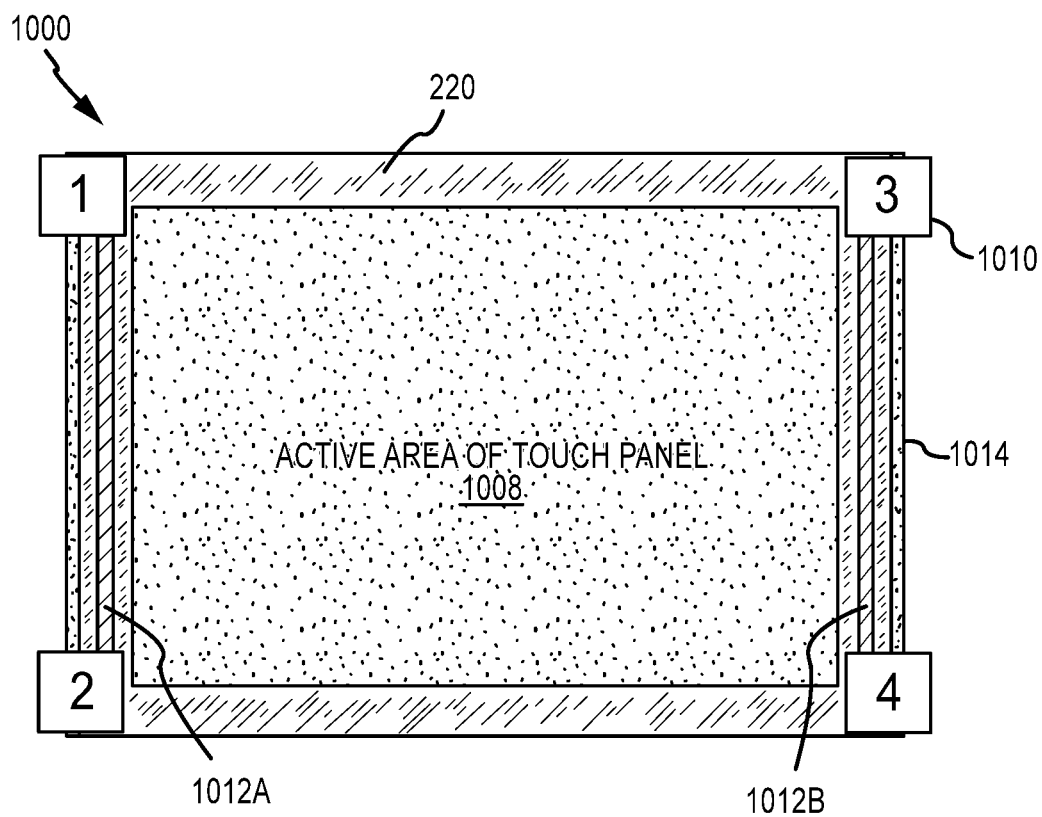
FIG. 10A illustrates a top view of a grounding configuration for a touch screen display with AGNW as shown in FIG. 2A or 2B.

FIG. 10A illustrates a top view of a grounding configuration for the IPS LCD 200 with AGNW as shown in FIGS. 2A and 2B. As shown, a glass layer 1014 is at the bottom of an AGNW coating 220 which is below the active area of touch panel 1008. The glass layer 1014 has a larger area than the active area of the touch panel 1008. The AGNW coating 220 and the active area of the touch panel 1008 are substantially rectangular in shape. There are four positions 1, 2, 3, and 4 at which copper tape is placed at the corner of the rectangle and on top of the AGNW coating 220. One conductive bar 1012A on top of the AGNW coating 220 may contact one edge of the AGNW coating 220 and may connect copper tapes 1010 at positions 1 and 2. Another conductive bar 1012B may contact an opposite edge of the AGNW coating 220 and may connect copper tapes at positions 3 and 4. The conductive bars 1012A and 1012B may include conductive paste, such as silver paste.

The conductive bars and the conductive tapes are located outside the active area of the touch panel, which provides better grounding without impact on optical transmittance of the touch panel.

Figure 10B:
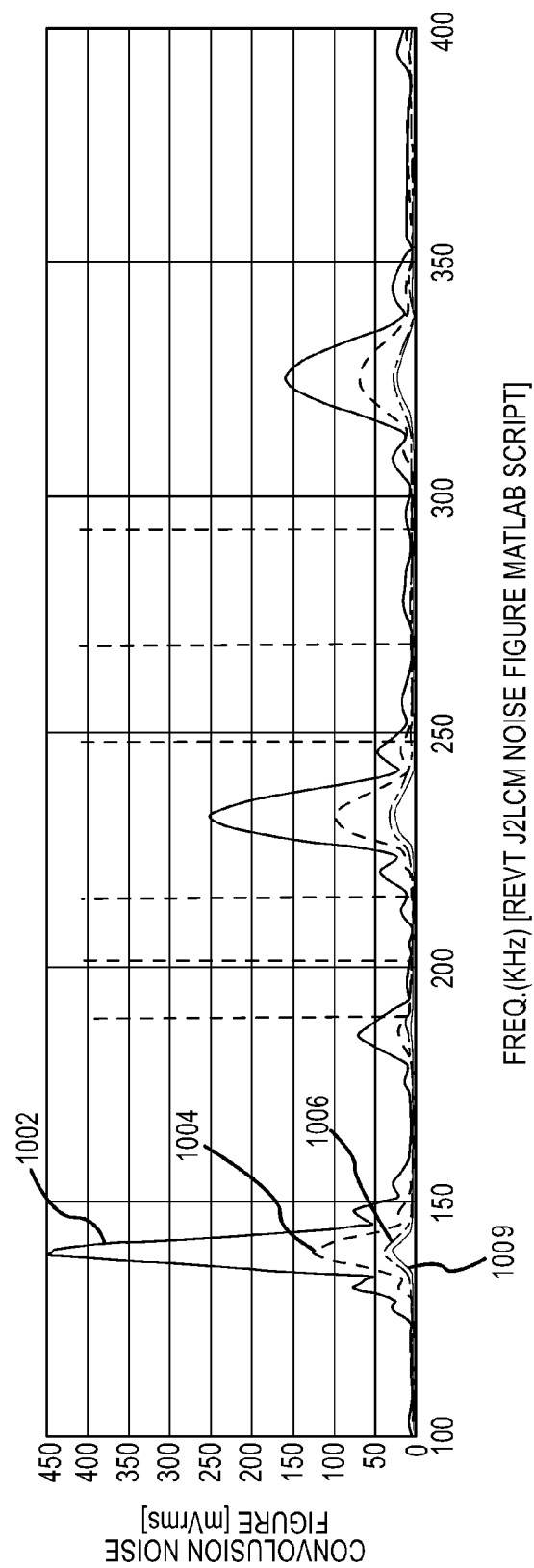
FIG. 10B illustrates sample noise curves for the grounding configurations of FIG. 10A and FIG. 9B.

FIG. 10B shows sample noise curves for several grounding configurations of FIG. 10A and FIG. 9B illustrating the effect of copper tape and the location of the copper tape on grounding. Typically, lower noise indicates better grounding. As shown, curve 1002 for grounding configuration 900B shows the highest noise, because there is no grounding without ITO or AGNW as well as copper tapes.

Compared to curve 1002, curve 1004 for grounding configuration 1000 with the copper tapes at corner positions 1 and 2 shows lower noise. Similarly, if copper tapes are placed at positions 3 and 4, grounding results would be essentially the same as that of positions 1 and 2.

Curve 1006 for the grounding configuration 1000 with the copper tapes at corner positions 1, 2, 3, and 4 show the lowest noise. Curve 1009 represents the grounding configuration with copper tapes positioned at three corners, such as at any three of positions 1, 2, 3 and 4. This suggests that the grounding configuration 1000 with the copper tape placed at three or four corners of the touch panel provides grounding and may reduce noise.

Generally, the ITO is deposited on the CF glass in a vacuum, such as by sputtering. The AGNW may be coated on a plastic film such as a TAC film by using a roll-to-roll process. The roll-to-roll process is usually simpler and cheaper than the sputtering. Additionally, the AGNW may be easier to provide consistent thickness than the ITO during fabrication. For example, the ITO coating may be deposited over the CF glass by sputtering, which would have cause larger variation in a thicker ITO coating. This large variation in thickness may require a post processing to minimize the thickness variation and thus may increase fabrication complexity.

One of the benefits of the present disclosure is to enable a thinner display product. The transparent conducting layer may be much thinner than a conventional conducting layer, such as ITO, but provide the same sheet resistance and/or electrical shielding. The transparent conducting layer, such as silver nano-wire, may improve light transmittance and reduce reflection, and thus enable better power efficiency and/or longer battery life. High light transmittance and low sheet resistance may not be simultaneously achieved with the conventional conducting ITO layer. The AGNW layer may also reduce LCM noise from the TFT layer, which is coupled to a number of drive circuits. The AGNW layer may thus demonstrate a better shielding than the conventional conducting ITO layer.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A display comprising:
   a color filter layer;
   a polarizer having opposing first and second surfaces;
   a transparent conductive layer on the first surface of the polarizer;
   an indium-tin oxide layer between the color filter layer and the second surface of the polarizer;
   a first conductive tape at a first corner of the transparent conductive layer;
   a second conductive tape at a second corner of the transparent conductive layer; and
   a conductive bar configured to connect the first and second conductive tapes.

2. The display defined in claim 1, wherein the transparent conductive layer comprises silver nano wire mesh.

3. The display defined in claim 1, wherein the transparent conductive layer has a transmittance of at least 97%.

4. The display defined in claim 1, wherein the display further comprises an anti-reflection coating on the transparent conductive layer.

5. The display defined in claim 1, wherein the indium tin oxide layer is a coating on the color filter layer, wherein the polarizer has a layer of adhesive that attaches the polarizer to the indium tin oxide layer, and wherein the display further comprises a cover glass that covers the polarizer.

6. A portable electronic device comprising:
a polarizer with first and second opposing surfaces;
a rectangular transparent conductive layer on the first surface of the polarizer having first and second adjoining edges that form a corner of the rectangular transparent conductive layer;
an indium-tin oxide layer coupled to the second surface of the polarizer; and
conductive tape that overlaps the corner and extends along the first and second adjoining edges, wherein the conductive tape contacts the transparent conductive layer.

7. The portable electronic device defined in claim 6, wherein the transparent conductive layer comprises silver nano wire mesh.

8. The portable electronic device defined in claim 6, further comprising:
a glass layer, wherein the indium-tin oxide layer is interposed between the glass layer and the polarizer.

9. The portable electronic device defined in claim 8, wherein the indium-tin oxide layer is in direct contact with the glass layer.

10. The portable electronic device define din claim 8, wherein the glass layer comprises a color filter glass layer.

11. The portable electronic device defined in claim 6, further comprising:
a touch panel, wherein the transparent conductive layer is interposed between the touch panel and the polarizer.

12. The portable electronic device defined in claim 11, further comprising:
an adhesive layer, wherein the adhesive layer attaches the touch panel directly to the transparent conductive layer.

13. A polarizer comprising:
a polarizer component;
a transparent conductive layer disposed over the polarizer component;
a first conductive tape contacting the transparent conductive layer at a first position;
a second conductive tape contacting the transparent conductive layer at a second position; and
a conductive bar configured to connect the first and second conductive tapes.

14. The polarizer defined in claim 13, wherein the transparent conductive layer comprises silver nano wire mesh.

15. The polarizer defined in claim 14, wherein the first conductive tape and the second conductive tape each comprise copper.

16. The polarizer defined in claim 15, wherein the conductive bar comprises silver.

17. An apparatus comprising:
a display;
a polarizer having opposing first and second surfaces;
a first transparent conductive coating on the display and adjacent to the second surface of the polarizer;
a second transparent conductive coating on the first surface of the polarizer; and
a conductive bar that contacts a portion of the second transparent conductive coating along an edge of the second transparent conductive coating.

18. The apparatus defined in claim 17, wherein the conductive bar comprises silver.

19. The apparatus defined in claim 17, wherein the second transparent conductive coating comprises silver nano wire mesh.

20. The apparatus defined in claim 19, wherein the first transparent conductive coating comprises a layer of indium tin oxide.

21. The apparatus defined in claim 20, wherein the display comprises a liquid crystal display.

* * * * *